No. 723,364. PATENTED MAR. 24, 1903.
F. CHAMBORDON.
RAIL JOINT NUT LOCK.
APPLICATION FILED JUNE 6, 1902.
NO MODEL.
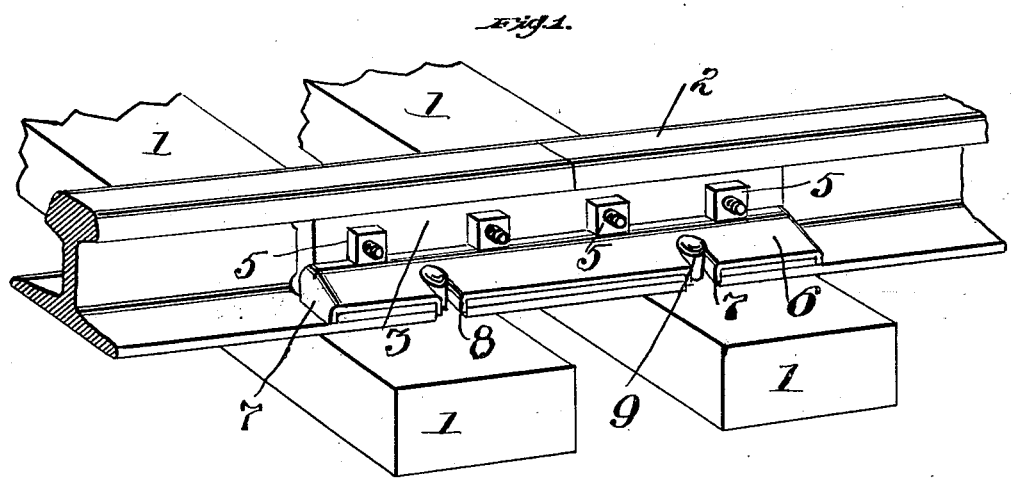
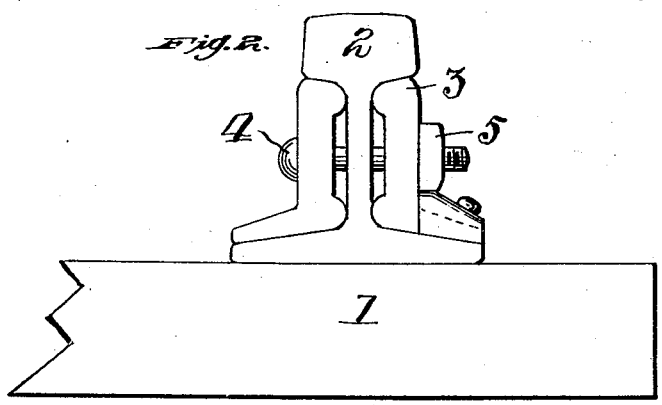
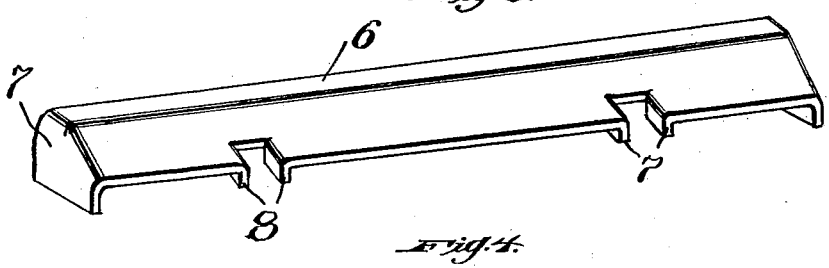
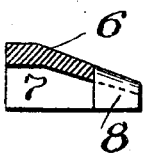
Witnesses: Inventor
F. Chambordon

UNITED STATES PATENT OFFICE.

FRANK CHAMBORDON, OF BRABURN, PENNSYLVANIA.

RAIL-JOINT NUT-LOCK.

SPECIFICATION forming part of Letters Patent No. 723,364, dated March 24, 1903.

Application filed June 6, 1902. Serial No. 110,547. (No model.)

*To all whom it may concern:*

Be it known that I, FRANK CHAMBORDON, a citizen of the United States, residing at Braburn, in the county of Westmoreland and State of Pennsylvania, have invented a new and useful Improvement in Rail-Joint Nut-Locks, of which improvement the following is a specification.

This invention relates to certain new and useful improvements in rail-joints, and relates more particularly to rail-joints where nuts and bolts are employed.

The invention has for its object the provision of novel means whereby the fish-plate or joint is provided with novel form of attachments that will prevent the nuts from turning and retain the series of nuts in position.

Another object of the invention is to provide a device of this character that will be extremely simple in construction, strong, durable, comparatively inexpensive to manufacture, and highly efficient in its use.

With the above and other objects in view the invention consists in the novel construction, combination, and arrangement of parts to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a perspective view of my improvements attached to the rails. Fig. 2 is an end view thereof. Fig. 3 is a perspective view of the plate. Fig. 4 is a transverse vertical sectional view thereof.

In the drawings the reference-numeral 1 represents the cross-ties, and 2 the rails. 3 represents the fish-plates, having bolts 4 and nuts 5 to secure the same together. A fastening-plate 6, having downwardly-extending ends 7 to correspond with the length of the fish-plate, is applied to the under face of the nuts. This plate 6 also has downwardly-extending lugs 7 7 and 8 8, forming openings therebetween to receive the spikes 9, which serve as means to fasten the plate in proper position.

The manner of operating my improved rail-joint is as follows: The plate 6 is placed against the under face of the nuts and then the plate is spiked down in position, as shown in Fig. 1 of the drawings, thereby preventing the nuts from turning or jarring loose.

The many advantages obtained by the use of my improved rail-joint will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a rail-joint, the combination of the rails and fish-plates, nuts and bolts for securing said rails together, a plate having downwardly-extending ends corresponding with the fish-plates, downwardly-extending lugs formed integral with said plate, and fastening means applied between said lugs to engage the cross-ties, substantially as described.

In testimony whereof I have hereunto signed my name in the presence of two subscribing witnesses.

FRANK CHAMBORDON.

In presence of—
    FRED. O. HENZI,
    M. HUNTER.